United States Patent

[11] 3,560,634

[72] Inventors Wolfgang Dillenburger;
Gerhard Krause, Darmstadt, Germany
[21] Appl. No. 704,603
[22] Filed Feb. 12, 1968
[45] Patented Feb. 2, 1971
[73] Assignee Fernseh G.m.b.H.
Darmstadt, Germany
a corporation of Germany
[32] Priority Feb. 16, 1967
[33] Germany
[31] F51539

[54] CIRCUIT ARRANGEMENT FOR TIME ERROR BALANCING
4 Claims, 6 Drawing Figs.

[52] U.S. Cl. .......... 178/5.2, 178/5.4
[51] Int. Cl. .......... H04n 9/02
[50] Field of Search .......... 178/5.2, 5.4, 6.6

[56] References Cited

UNITED STATES PATENTS

| | | | |
|---|---|---|---|
| 3,225,134 | 12/1965 | Jensen .......... | 178/5.4 |
| 3,428,745 | 2/1969 | Coleman, Jr. et al. .......... | 176/6.6 |

FOREIGN PATENTS

| | | | |
|---|---|---|---|
| 1,202,316 | 10/1965 | Germany .......... | 178/6.6 |

*Primary Examiner*—Richard Murray
*Attorney*—Ernest F. Marmorek

ABSTRACT: In addition to the conventional adjustably controllable delay line in the path of a color television signal, a delay line of fixed or constant transit time is herein included in the path of the color signal. The conventional adjustable delay line is controlled ordinarily by a function of the phase difference or error between the color sync signal and a fixed frequency signal reference. Here, the constant time delay line is given a transit time constant equal to one-half a period of the color carrier, which is constant, and serves as the reference frequency. That constant delay line is cut out of, or back into, circuit according to the amplitude of the error signal, whose amplitude is made a linear function of phase angle here.

Inventor:
Wolfgang Dillenburger
Gerhard Krause
by
Their Attorney

Inventor:
Wolfgang Dillenburger
Gerhard Krause by [signature]
Their Attorney.

CIRCUIT ARRANGEMENT FOR TIME ERROR BALANCING

This invention relates to a circuit arrangement for balancing the time error in a color television signal taken from a store or memory, such as a tape.

In one system for balancing the time error in a color television signal taken from a store, e.g., a magnetic tape, on which the color television signal is recorded by means of rotating magnetic heads in tracks extending transversely to the longitudinal direction of the magnetic tape, it is conventional to provide controlled delay lines in the path of the color television signal taken from the store and to alter the transit time of these delay lines by means of an error magnitude as a function of the time error. In this manner, time errors which cannot be eliminated by the mechanical controls of the tape, can be reduced to a very small, still permissible residual error.

In such systems in which television signals are magnetically stored in transverse tracks of a magnetic tape by means of rotating magnetic heads, it is conventional to provide a delay line, controlled by the time difference of the horizontal sync pulses contained in the television signal and a reference impulse sequence with constant impulse sequence frequency. However, with the magnetic storage of color television signals, the residual error contained in the signal behind this controlled delay line is still too large. In order to reduce this time error yet further, it is conventional to provide a further controlled delay line downstream of this first controlled delay line, wherein the control voltage of the second delay line depends on the phase difference between the color sync signal in the color television signal and a constant frequency reference signal. This second controlled delay line reduces the time error in the color television signal to the maximum permissible phase deviation of the color carrier. The control range of this second controlled delay line may comprise a time difference corresponding about to the duration of one oscillation of the color carrier.

In the magnetic storing of a color television signal, the exact temporal correlation between the horizontal sync signal and the color sync signal may be partly lost. In unfavorable cases, the time difference between the leading edge of the horizontal sync pulse and a certain phase position of the color sync signal may be changed to such an extent that the amount of this change amounts to a substantial part of the duration of the period of the color sync signal. The controlled second delay line, controlled by the phase difference between the color sync signal and the reference signal, has to balance this substantial change and will adjust itself at a working point near one limit of its control range. However, in consequence, this controlled delay line is no longer in a position of transmitting correctly the signal portions occurring in the direction towards the limit of the control range.

It is already known to eliminate this drawback by deriving from the control voltage for the second delay line, obtained by phase comparison with the color carrier frequency, the slow fluctuations of this control voltage and to change thereby the time position of the reference impulse with which the control voltage for the first delay line is obtained by phase comparison with the horizontal sync pulses of the color television signal. In this way the transit time of the signal in the first controlled delay line is so modified that the second controlled delay line operates again substantially in the center of its control range. However, by means of this known feature, only very slow changes in the time gap between horizontal sync signal and the color television signal can be equalized with regard to their effects on the working point of the second controlled transit time link. Quick changes, e.g., with a frequency of 50 cycles per second and their harmonics are not eliminated by this known arrangement, or are eliminated only incompletely.

In order to eliminate this drawback, in an arrangement for balancing the time error in a color television signal taken from a store by means of controlled delay lines, where in one delay line is controlled by an error signal which depends on the difference in the phase of the color sync signal in the color television signal and a comparison signal, there is arranged in the path of the color television signal, in series with the delay line with variable signal transit time, controlled by this error signal, a delay line with constant transit time, which is energized or deenergized when the error signal exceeds a predetermined amount, or threshold value.

That threshold value of the error signal may comprise a phase difference of ± 90 to ± 180° between the color sync signal and the reference signal and will be chosen with such magnitude that the control range of the delay line controlled by the error signal need by utilized only partly, e.g., only at one half.

One object of the invention is to provide a control system for modifying the path for a television signal taken from a store or memory, such as a tape, for example, in order to compensate for and diminish or eliminate time errors in the reproduced signal.

Another object of the invention is to provide two delay lines in a signal path, with one delay line variably controllable according to phase displacement of a color sync signal in the circuit path, and with the other delay line of fixed transit time and controlled to be totally inserted or withdrawn according to a threshold voltage linearly related to such phase displacement, whereby the variable controllable delay line may be controlled to operate over an optimum portion of its range.

The invention will now be described with reference to the embodiments shown in the accompanying drawings in which.

Figure 1:
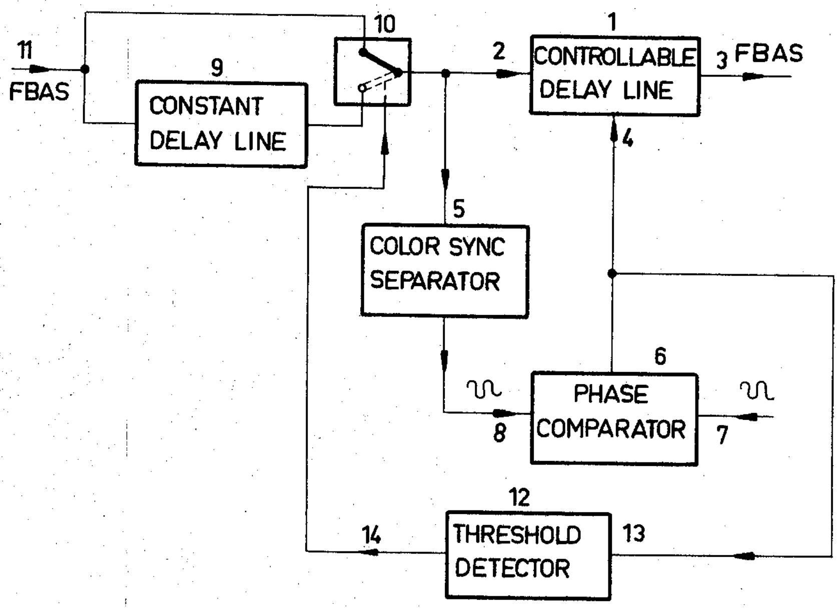
FIG. 1 shows a circuit according to the invention in the form of a block diagram.

In FIG. 1, 1 is a controllable delay line. The delay line 1 receives at input 2 the signal to be delayed and at output 3 the signal is delivered with a delay, the magnitude of which is determined by the control voltage applied at 4. From the color television signal applied to the delay line at input 2, the color sync signal burst is derived in the color sync separator 5. A phase comparator stage 6 compares the phase of the color sync signal with the phase of a constant frequency color carrier oscillation applied to the comparator stage 6 at 7. The comparator output as a control voltage, dependent on the phase difference, changes the transit time of the color television signal in the controlled delay line 1 so that the phase position of the color sync signal of the color television signal at the output 3 coincides practically with the phase position of the reference signal.

According to the invention, a second delay line 9 is provided, which has a constant signal transit time, and which can be inserted in circuit or excluded from the circuit by means of an electronic switch 10. In one position of the switch 10, the delay line 9 is in the circuit path of the color television signal and delays the same by a certain amount; in the other position of the switch 10, the color television signal applied at 11, reaches the controlled delay line 1 without delay. Switching between these two signal paths occurs always when the amount of the control voltage for the delay line 1 exceeds a certain amount. The switching voltage is derived from the control voltage by means of a threshold value detector 12, which measures the output voltage from comparator 6.

Figure 2:
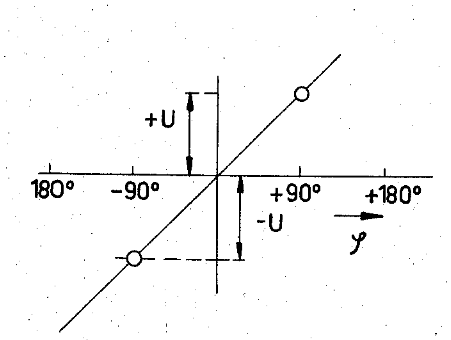
FIG. 2 is the characteristic of the phase comparison circuit for producing the control signal for the controlled delay line.

By way of explanation of the operation and as example for the dimensioning of the circuit of FIG. 1, FIG. 2 shows the characteristic of the phase comparator 6. The abscissa shows the phase difference between the color sync signal and the comparison signal, starting from a mean value in the positive and negative directions. The ordinate indicates the values of the output control voltage corresponding to the phase deviations. Let it be assumed that the useful range of the controllable delay line is almost a full oscillation duration of the color carrier. With a color carrier frequency at about 4.35 Mc/s this corresponds to a transit time difference of the delay line between the limits of the control range of about 220 nanoseconds.

If the amount of the phase deviation between the color sync signal and the reference signal reaches a predetermined value of, e.g. + or − 90°, the corresponding value of the control voltage + U or − U produces at the threshold value detector 12 (FIG. 1) a switching voltage which switches the electronic switch 10 and changes the signal delay by the amount of the signal delay in the fixed delay line 9. This signal delay time may correspond, e.g., to a phase difference of 180° of the color carrier frequency and may amount to about 110 nanoseconds with a color carrier frequency of about 4.43 Mc/s. Thus, if the phase deviation of the color sync signal and the reference signal exceeds 90° in the positive and negative direction from the mean value, the change in the signal transit time of the delay line 9 changes the signal transit time and with it also the phase position of the color sync signal in the color television signal so that the controlled delay line 1 operates always within the range of ± 90°.

The threshold value detector 12 gives a switching voltage for the electronic switch 10 whenever the amount of the control voltage for the delay line 1 exceeds a given threshold value, irrespective of the polarity of this voltage.

Figure 3:
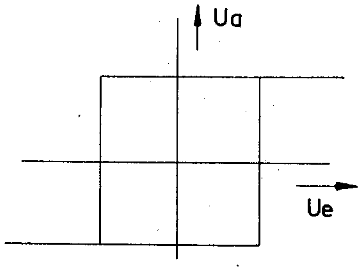
FIG. 3 is the characteristic of the arrangement for energizing and deenergizing the constant transit time delay line.

FIG. 3 shows in diagrammatical form the connection between the output voltage U*a* and the input voltage U*e* of the threshold value detector 12.

Figure 4:
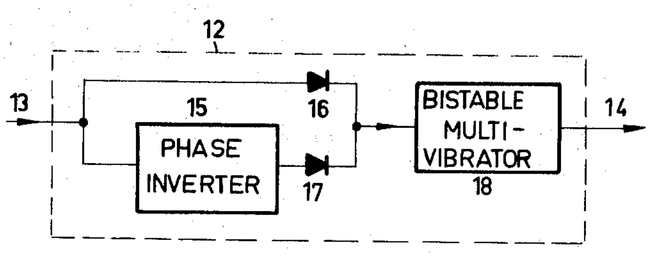
FIG. 4 is an arrangement for deriving the switching voltage from the error signal, shown diagrammatically.

FIG. 4 shows an embodiment of a circuit for the threshold detector 12 in diagrammatical form. By means of a phase inverter 15 and two diodes 16 and 17, a bistable multivibrator 18 receives a control signal with the same polarity irrespective of the polarity of the control voltage, and this signal switches the multivibrator always into the other position when the predetermined threshold value is exceeded, so that its output 14 issues the switching signal.

Figure 5:
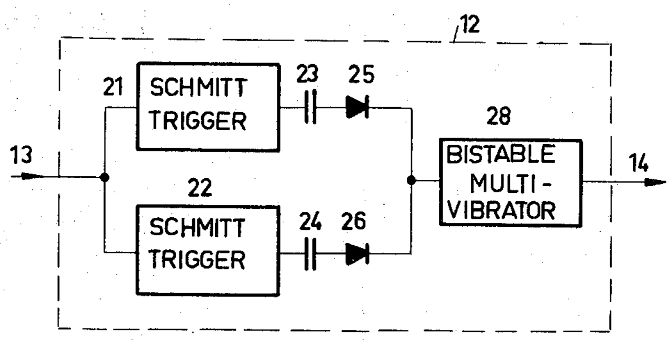
FIG. 5 shows another arrangement for deriving the switching voltage from the error signal, also diagrammatically.

FIG. 5 shows another embodiment of the threshold value detector 12. The control voltage, applied at input 13, reaches two Schmitt triggers 21, 22, whose output impulses are applied through capacitors 23, 24 and diodes 25, 26 again to a bistable multivibrator 28 which issues the switching voltage at output 14.

Figure 6:
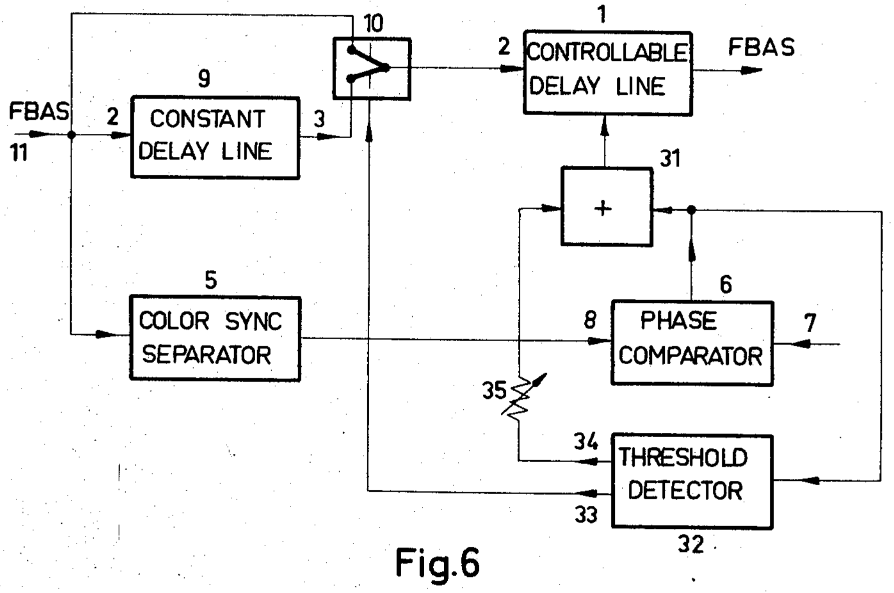
FIG. 6 is a further circuit according to the invention in the form of a block diagram.

FIG. 6 shows yet another embodiment of the circuit according to the invention. The color sync signal for comparison with the reference signal in the phase comparator 6 is derived from the color television signal applied at input 11, ahead of the two delay lines 1 and 9 and the switch 10. This arrangement therefore acts after the manner of an open loop control. The threshold value detector 32 must output in this case not only the switching voltage for the electronic switch 10 as output 33, but also a second voltage output at 34. This is added to the control voltage for the controlled delay line 1 at 31 and should be so adjusted that the delay of the delay line 1, is reduced by the amount of the fixed transit time in the delay line 9, when the delay line 9 is switched in by means of the switch 10.

The switching of the delay line 9 by means of the electronic switch 10 may be effected immediately after the phase comparison in the same blanking interval. In this case, the switching must be very rapid. To this end, a second simple phase detector is provided outside the phase comparator 6, in order to derive the switching voltage. Another modification performs the switching during the blanking interval following the phase comparison, but before the occurrence of the color sync signal therein. This is achieved, e.g., by taking the input voltage, applied to the threshold value detector 12 at 13 (FIG. 1), through a gate, which conducts only during the period of the leading edge of the line synchronizing impulse.

We claim:

1. A system for reproducing a color television signal from a storage tape, including:

- a variably controllable delay line to transmit a color television signal derived from said tape;
- means for deriving a reference signal from said television signal;
- means for detecting a color sync signal from said television signal;
- a comparator for comparing said sync signal and said reference signal, and for generating a difference output voltage;
- a second delay line having a constant transit time characteristic in series relation with said variably controllable delay line;
- and means responsive to said comparator output voltage for controlling said second delay line by rendering said second delay line effective or noneffective in said system, when said comparator output voltage exceeds a predetermined magnitude.

2. A system, as in claim 1, in which:

- said second delay line has a constant transit time characteristic equal substantially to one-half of the period of the color carrier frequency in the color television signal;
- and said threshold value of said comparator output signal corresponds to a change in the phase angle of said color carrier of about ± 90° within the controllable delay line.

3. A system, as in claim 1, in which: said comparator is adjusted to cause said threshold value to correspond to a phase difference of ± 90° to ± 180° between the color sync signal and the said reference signal.

4. A system, as in claim 1, in which said constant transit time delay line, upon being inserted into said signal path, serves to reduce the transit time of the signal in the variable delay line by the time constant of the fixed time delay line.